Jan. 17, 1967   B. W. BEDELL   3,298,127
LINE DISPENSER
Filed Sept. 18, 1964
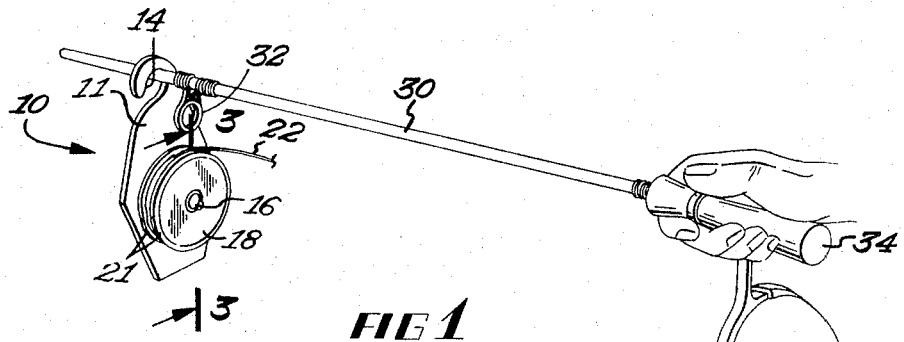
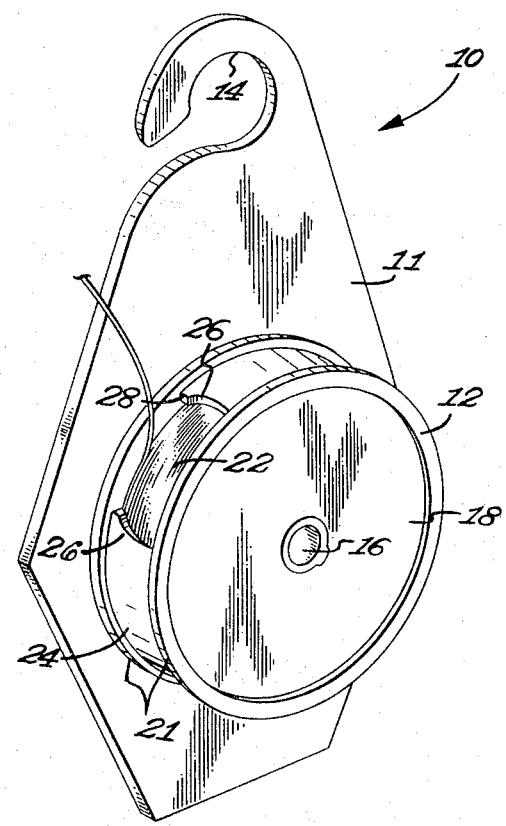
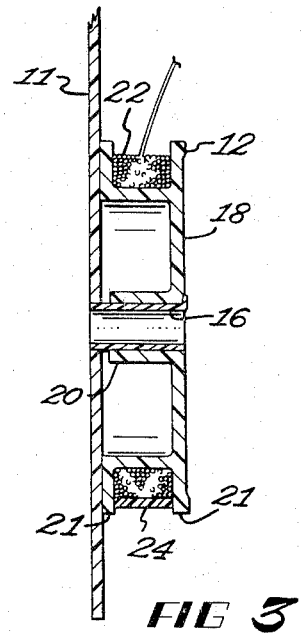
INVENTOR.
BERKLEY W. BEDELL
BY
Meyers & Peterson
ATTORNEYS

United States Patent Office 3,298,127
Patented Jan. 17, 1967

3,298,127
LINE DISPENSER
Berkley W. Bedell, Highways 9 and 71,
Spirit Lake, Iowa 51360
Filed Sept. 18, 1964, Ser. No. 397,371
7 Claims. (Cl. 43—25.2)

The present invention relates generally to fishing tackle accessories, and more particularly to a backing plate utilized in combination with a spool carrying a supply of fishing line, the backing plate being provided with a hook means at one end thereof so that the line may be readily transferred from the spool onto the reel of a fishing rod.

Briefly, in accordance with the present invention, a backing or mounting plate is provided which is adapted to receive a spool carrying a supply of fishing line thereon, the spool being mounted for axial rotation relative to the backing plate. The backing plate has a hook formed therein for receiving the shaft of a fishing rod therein, whereby the unit may be suspended, as desired, from the fishing rod and the supply of line then being transferred onto the reel therefrom. In addition, the spool is provided with a clip in the form of a resilient arcuate segment partially encircling the spool of line, the clip retaining the line on the spool and preventing unraveling thereof. In addition, the resilient clip is sufficiently flexible in order to permit the line to be controllably removed from the spool with the clip in place, if desired, during the transfer of the line from the spool onto the reel. Normally, however, the clip will be removed during the transfer operation.

In order to substantially eliminate generation of an undesirable twist into the line during the transfer onto the bale of a spinning reel, the windings on the spool proceed in the same direction as the windings on the bale to which the line is being transferred, while the transfer operation is in process. In other words, as the line is unraveled from the spool, the individual windings leave the spool in the same arcuate direction as they are wound on the bale of the spinning reel. Normally, spinning reels have a bale which winds the line in a clockwise direction as viewed from the rear of the reel.

Therefore, it is an object of the present invention to provide a device for assisting the fisherman in the improved transfer of fishing line from the supply spool to the bale or spool of a reel on a fishing rod so that the line can then be used in the normal and ordinary manner; means being provided whereby the backing plate can be suspended from the fishing rod during the line transferring operation.

It is still a further object of the present invention to provide a device of the foregoing character that will function as a retainer means for the line supply on the spool when full, thereby preventing the fishing line from inadvertently unwinding therefrom.

It is yet a further object of the present invention to provide a device of the foregoing character which will permit introduction of a fishing line onto a spinning reel with substantial elimination of the generation of a twist in the line during the transfer operation.

It is still an additional object of the present invention to provide a simplified backing plate which has means permitting the fisherman to attach or suspend the spool retaining plate from the fishing rod, the plate being received along the fishing rod at a point adjacent the first eyelet and outward from the handle, the backing plate being held at that point by means of the eyelet.

These and other objects and advantages of the invention will more fully appear from the following description, made in connection with the accompanying drawing, wherein like reference characters refer to the same or similar parts throughout the several views and in which:

FIGURE 1 is a perspective view of the lower portion of the fishing rod including the handle and reel and showing the device of the present invention in actual use therewith;

FIGURE 2 is a perspective view, on a slightly enlarged scale, showing the apparatus of the present invention; and FIGURE 3 is a partial vertical sectional view, on a slightly enlarged scale, taken along the line and in the direction of the arrows 3—3 of FIGURE 1.

In accordance with the preferred modification of the present invention, the line retaining device generally designated 10 includes a backing or mounting plate 11 and a conventional line retaining spool 12. The backing plate has a hook area 14 formed at one end thereof and also has a shaft 16 secured thereto and locked thereon, the axis of the shaft being normal to the plane of the plate 11. The hook 14 defines an entrance slot wide enough to receive the rod and an enlarged rod-receiving opening which is made large enough to permit the plate to be held on the rod with the plane of the plate substantially parallel to the axis of the rod. The spool 12 is provided with a spool body 18 having a central hub member 20 received about the shaft 16, and mounted for axial rotation thereon. A supply of line is provided on the spool 12, such as at 22. The supply of line is covered by a resilient arcuate segment member 24, this member being fabricated of a plastic material such as polystyrene or the like and having normal diameter which firmly engages and encompasses the line supply 22.

As seen in FIGURE 2, the end portions of the arcuate member 24 are provided with a concave area as at 26—26, this feature being provided in order to enhance the removal of the various windings of line from the supply 22 on the spool 12 in the event the user leaves the clip on during the transfer operation. The shoulder areas 28 which are provided adjacent the concave portions 26 normally provide smoother removal of the supply.

It will be recognized that the spool 12 is disposed at a point removed from the hook area 14 by a distance greater than the outward projection of eyelet 32 from rod 30, and this provides a substantial area on the backing member 11 for printing indicia and other instructions as may be desired. This distance between the hook area and the spool must be provided to maintain the eyelet out of contact with the spool so that the eyelet will not interfere with the normal removal of the line supply from the spool 12.

In a special situation, such as with a conventional fishing reel having a line spool with an axis transverse to the axis of the rod, the fisherman may desire to remove the line by axial rotation of the spool 12, in which case the axis of the shaft 16 would be turned substantially parallel to the axis of the spool on the reel. While the clip 24 would be removed, it may be left on to rotate. The member 24 slides about the surface of the line supply 22. Again, in this instance, the concave areas 26 act as guide surfaces, enhancing the removal of the line and reducing the chance of snarls developing. Introduction of a twist is eliminated since the line will be taken off the spool 12 in such a way that the winding axis such as manifested by the shaft 16 is generally normal to the direction of travel of the line from the spool 12 to the fisherman's reel.

In utilizing the apparatus of the present invention, the fisherman places the assembly 10 on the rod member 30 at a point beyond the eyelet 32. Preferably, the eyelet 32 is the first eyelet in the line moving from the handle area outwardly. The rod 30 has a handle area 34 which is designed for grasp by the fisherman's hand, the reel 36 being mounted on or adjacent to the handle area of the rod 30. With the hook 14 suspending the unit 10 from the rod 30, the line is permitted to play outwardly between the edges of the arcuate member 24 and the edges 21 of the spool 12. In this connection, the line is taken up on the reel 36 in the conventional manner.

As illustrated, the resilient arcuate member 24 exerts a modest compressive pressure on the line supply 22 at all times. In this connection, as the line is being pulled from the spool 12, the pressure and frictional engagement between the member 24 and the line supply 22 prevents the over-running of the line as it is payed out from the spool. This eliminates the danger of producing a slack in the line between the reel and the spool which may result in the line becoming snarled or entangled. Since the axis of the bale in reel 36 is parallel to the axis of the rod, and since the arcuate direction of unwinding of the spool matches the arcuate direction of winding on the bale, twisting of the line is avoided.

The arcuate member 24 acts primarily as a line retainer during the period that the spool is packaged pending use. The arrangement is is particularly well adapted to a bubble package technique, if desired however, individual packaging is not required. At any rate, when the spool is removed from the box, carton, or the like, the user need not be concerned about any inadvertent premature unwinding of the line. The clip 24 is normally not removed until the user is ready to transfer the line to the reel.

It will, of course, be understood that various changes may be made in the form, details, arrangements, and proportions of the parts without departing from the scope of my invention as set forth in the appended claims.

What is claimed:
1. A device for use in transferring a fishing line from a spool to the reel of a fishing rod having an eyelet and a predetermined diameter at a point beyond said eyelet, the device comprising:
   a backing plate having a rod receiving hook disposed on one end thereof, a shaft secured to said backing plate along the surface thereof and disposed normal to said surface, said hook defining an opening which is large with respect to said diameter of said fishing rod whereby said backing plate may be positioned on said fishing rod with the axis of said shaft substantially normal to the axis of said fishing rod, and
   a line retaining spool being disposed axially on said shaft, having a supply of line along the winding periphery thereof, and being rotatable about the axis of said shaft.

2. The device of claim 1 being particularly characterized in that said line is wound about said spool to unravel in the same arcuate direction as the line is taken up on the bale of a spinning reel.

3. The device of claim 1 being particularly characterized in that said rod receiving hook is formed integrally on said mounting plate.

4. The device of claim 1, being particularly characterized in that said shaft is spaced from said hook by a distance which exceeds the radius of said spool by a distance at least as great as the maximum projecting dimension of said eyelet on said rod, whereby said device may be placed on said fishing rod at said point beyond said eyelet from the handle of said fishing rod and with said backing plate in engagement with said eyelet without interference by said eyelet with normal removal of line from said spool.

5. A device for use in transferring a fishing line from a spool to the reel of a fishing rod, said fishing rod having an eyelet thereon and having a predetermined diameter at an axial point just beyond said eyelet from said reel, the device comprising;
   a backing plate having a rod receiving hook thereon, said hook defining a rod receiving entrance slot and opening, said entrance slot having a width just exceeding said predetermined diameter of said rod and said opening being substantially larger than said predetermined diameter whereby said backing plate may be canted on said fishing rod to dispose its general plane substantially parallel to the axis of said fishing rod,
   a shaft secured to said backing plate and extending normally therefrom, and
   a line retaining spool rotatably mounted on said shaft.

6. The device of claim 5 being particularly characterized in that said shaft is spaced from said hook by a distance which exceeds the sum of the radius of said spool and the projecting distance of said eyelet whereby said eyelet will not interfere with the normal removal of line from said spool when said device is in place on said fishing rod.

7. The device of claim 5 being particularly characterized in that said hook is coplanar with said backing plate and is formed intregrally therewith.

References Cited by the Examiner
UNITED STATES PATENTS

| | | | |
|---|---|---|---|
| 358,675 | 3/1887 | Kenyon et al. | 242—125.3 |
| 1,568,309 | 1/1926 | Auld | 242—84.1 |
| 1,784,064 | 12/1930 | Griswold | 242—100 |
| 1,908,278 | 5/1933 | Angell | 206—52 |
| 2,501,201 | 3/1950 | Wilcox | 242—105 X |

SAMUEL KOREN, *Primary Examiner.*

W. H. CAMP, *Assistant Examiner.*